J. DAIN.
TONGUE TRUCK FOR HARVESTERS.
APPLICATION FILED JAN. 13, 1913.

1,156,216.

Patented Oct. 12, 1915.
2 SHEETS—SHEET 1.

Witnesses:

Inventor:
Joseph Dain
By W.C. Jordinston
his Attorney

J. DAIN.
TONGUE TRUCK FOR HARVESTERS.
APPLICATION FILED JAN. 13, 1913.

1,156,216.

Patented Oct. 12, 1915.
2 SHEETS—SHEET 2.

UNITED STATES PATENT OFFICE.

JOSEPH DAIN, OF MOLINE, ILLINOIS, ASSIGNOR TO DEERE & COMPANY, OF MOLINE, ILLINOIS, A CORPORATION OF ILLINOIS.

TONGUE-TRUCK FOR HARVESTERS.

1,156,216.

Specification of Letters Patent.

Patented Oct. 12, 1915.

Application filed January 13, 1913. Serial No. 741,764.

*To all whom it may concern:*

Be it known that I, JOSEPH DAIN, a citizen of the United States, residing at Moline, in the county of Rock Island and State of Illinois, have invented certain new and useful Improvements in Tongue-Trucks for Harvesters, of which the following is a specification, reference being had therein to the accompanying drawing.

My invention relates to tongue trucks for harvesters and other agricultural implements, upon which the stub tongue of an implement is supported, and my object is to provide a tongue truck by which the implement can be readily steered.

A further object of my invention is the novel arrangement of the parts by which the tongue-truck will be deflected to a greater degree than the pole tongue when turning the implement with which it is used.

Figure 1:
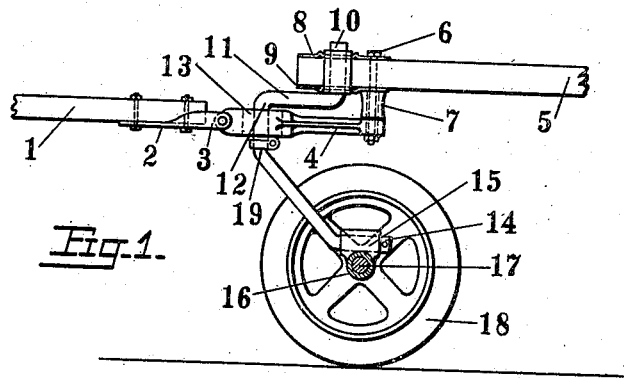
Figure 2:
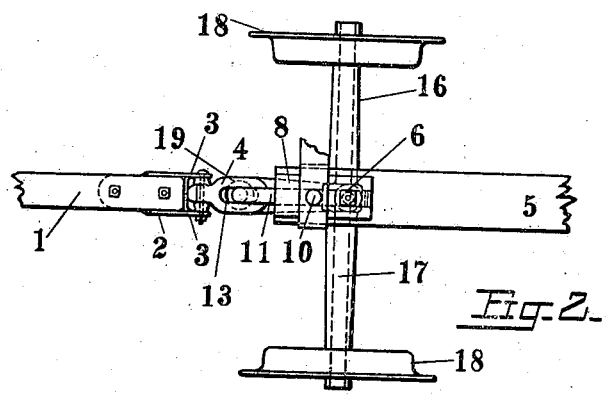
Figure 3:
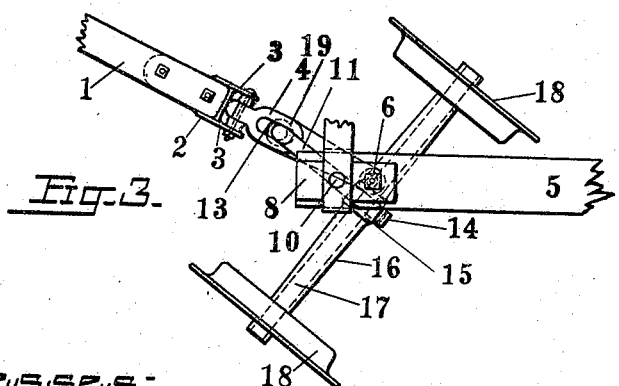
Figure 4:
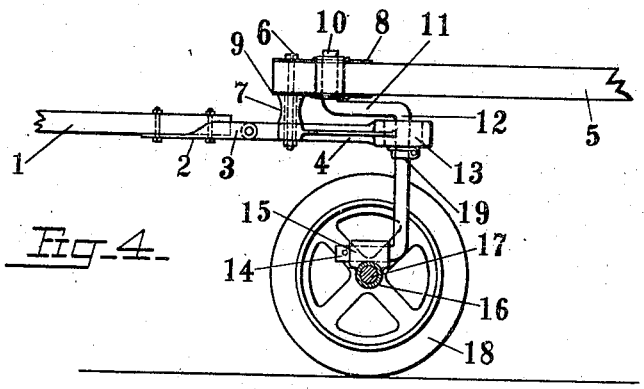
Figure 5:
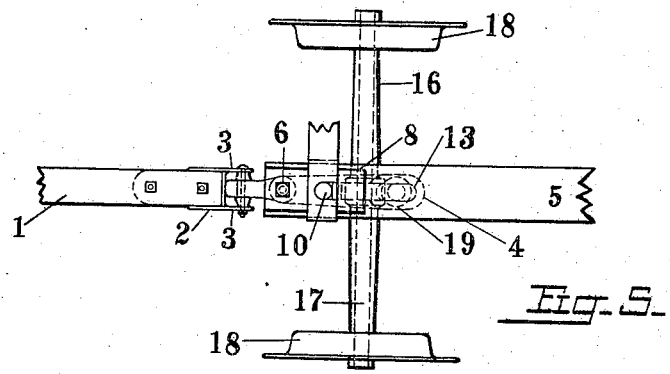
Figure 6:
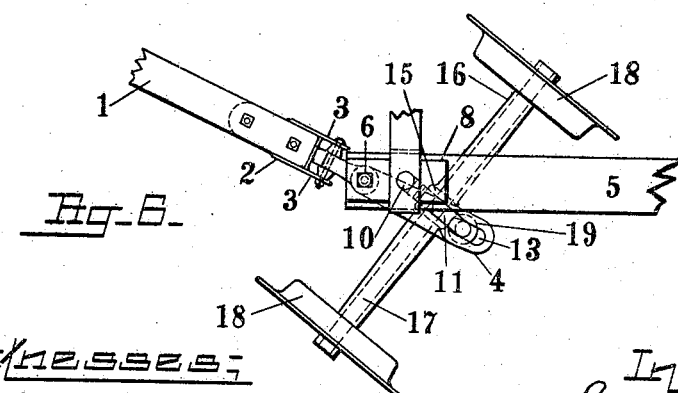

Referring to the drawings in which similar numerals indicate identical parts—Figure 1 is a side elevation of my improved truck in part section with the stub and pole tongues broken away. Fig. 2 is a plan view of Fig. 1. Fig. 3 is a plan view showing the relative position of the part when making a turn. Figs. 4, 5 and 6 are views similar to Figs. 1, 2, and 3 to illustrate a modification of my device.

A pole tongue 1 has secured to it a casting 2 having rearwardly projecting arms 3 between which is horizontally pivoted the forward end of a rearwardly extending member 4, which may be considered as part of the pole tongue 1; the member 4 is vertically pivoted to a stub tongue 5 which is shown broken but which may be attached to any of various machines and implements. The connection of the pole tongue with the member 4 is flexible vertically to allow the truck to travel over uneven ground without strain upon the horses pulling the machine. The vertical pivot by which the member 4 is secured to the stub tongue 5 consists of a bolt 6 projected upwardly through a spacing block 7 and through the stub tongue 5 and plates 8 and 9 on the upper and lower sides respectively of the stub tongue 5, and secured in place by a suitable nut.

Journaled in the forward part of the stub tongue 5 is the vertical portion 10 of a crank standard which has a portion 11 at an angle to the portion 10, and a portion 12 bent downwardly at an angle to the portion 11 to form a crank, the portion 12 of which passes through and engages with a slot 13 in the member 4; below the member 4 the standard extends downwardly, its end portion 14 being horizontal and pivotally supported in a bearing 15 preferably forming a part of a tubular member 16, through which the axle 17 passes, the latter being supported by wheels 18 which may be flanged, as shown, or otherwise formed. I provide a collar 19 on the crank standard to limit the downward movement of the pole tongue 1 thereon.

When the pole tongue 1 is moved laterally for the purpose of changing the direction of travel of the machine, the crank standard, having its vertical pivot on the stub tongue, is deflected to a greater degree laterally than the pole tongue by reason of the engagement of the vertical portion 12 of the crank standard with the member 4 through the slot 13, the vertical portion 12 moving longitudinally of the slot 13 as the pole tongue is moved horizontally either way, the distance between the pivotal connection of the pole tongue on the stub tongue and the engagement of the former with the crank standard being greater than the distance between the pivotal connection of the crank standard on the stub tongue and the point of engagement of the crank standard and pole tongue gives a long leverage which causes an instant response of the truck to the movement of the pole tongue. As shown in the drawings the pivot of the crank standard on the stub tongue is forwardly of the vertical axis of the truck axle. The horizontal pivot of the crank standard on the truck permits the latter to follow the undulations of the ground, and the assembled relation of the parts of my invention practically eliminates the liability of overturning the truck when changing the direction of travel of the machine.

In the modification shown in Figs. 4, 5, 6, the pole tongue 1 is pivoted to the forward end of the stub tongue 5, forward of the pivot of the crank standard thereon; the portion 11 of the crank standard extends rearwardly and has the portion 12 bent downwardly at an angle to the portion 11 and engaging with the rear end of the pole tongue 1 through a slot 13 therein. The end portion 14 of the crank standard is pivotally supported in the bearing 15 in the tubular member 16 in which the axle 17 is mounted, the portion 12 of the crank standard between the portions 11 and 14 thereof being perpendicular. The relative position of the parts is the reverse of the relative position shown in Figs. 1, 2, and 3, the action and results are similar however.

What I claim is—

1. A tongue truck for harvesting machines or the like, having in combination an axle having supporting wheels, a stub tongue, a standard pivoted on the stub tongue and axle and adapted to be swung laterally and having an intermediate portion bent to form a crank, and a pole tongue pivoted on the stub tongue and engaging with the crank portion of the standard.

2. A tongue truck for harvesting machines or the like, comprising an axle having supporting wheels, a stub tongue, a standard pivoted on the stub tongue and axle and bent intermediate its ends to form a crank, and a pole tongue pivoted on the stub tongue and having a sliding engagement with the crank portion of the standard.

3. A tongue truck for harvesting machines or the like having in combination an axle having supporting wheels, a stub tongue, a standard pivoted on the stub tongue and axle and bent intermediate its ends to form a crank, and a pole tongue pivoted to the stub tongue to swing laterally and engaging with the crank portion of the standard, the distance between the pivot of the pole tongue on the stub tongue and the point of engagement of the pole tongue with the crank portion of the standard decreasing as the pole tongue is swung laterally.

4. A tongue truck for harvesting machines or the like having in combination, an axle having supporting wheels, a stub tongue, a standard pivotally connecting said stub tongue and axle and bent intermediate its ends to form a crank, a pole tongue pivoted on the stub tongue to swing laterally and having a sliding engagement with the crank portion of the standard, the distance between the pivot of the pole tongue on the stub tongue, and the point of engagement of the pole tongue with the crank portion of the standard decreasing as the pole tongue is swung laterally.

5. A tongue truck for harvesting machines or the like having in combination, an axle having supporting wheels, a stub tongue, a standard pivotally connecting said stub tongue and axle and bent intermediate its ends to form a crank, a portion of said crank extending substantially parallel with the stub tongue, and a pole tongue pivoted on the stub tongue and having a sliding engagement with the crank portion of the standard.

6. A tongue truck for harvesting machines or the like, having in combination, an axle having supporting wheels, a stub tongue, a standard vertically pivoted on said stub tongue, and pivoted on said axle at right angles to the axis thereof, said standard having a portion bent at an angle to its vertical pivot on the stub tongue to form a crank, and a pole tongue pivoted on the stub tongue and engaging with the crank portion thereof.

7. A tongue truck for harvesting machines or the like, having in combination, an axle having supporting wheels, a stub tongue, a crank standard pivotally connected to the stub tongue and connected to said axle substantially at right angles thereto, and a pole tongue pivoted on the stub tongue and engaging the crank standard.

8. A tongue truck for harvesting machines or the like, having in combination, an axle having supporting wheels, a stub tongue, a crank standard having a vertical portion pivoted on the stub tongue, a portion of said crank standard bent substantially at a right angle to the vertical portion, a portion extending downwardly and pivotally connected to said axle, and a pole tongue pivoted on the stub tongue and engaging said downwardly extending portion of the crank standard.

9. A tongue truck for harvesting machines or the like having in combination, an axle having supporting wheels, a stub tongue, a standard bent intermediate its ends to form a crank, a pole tongue pivoted on the stub tongue to swing laterall and a longitudinally disposed slot in the pole tongue with which the crank portion of the standard slidably engages.

10. A tongue truck for harvesting machines or the like, comprising an axle having supporting wheels, a stub tongue, a crank standard pivotally connected with said stub tongue and axle, and a pole tongue pivoted on the stub tongue, and engaging with said crank standard, the distance between the pivotal connection of said pole tongue on the stub tongue, and the engagement of the pole tongue with the crank standard being greater than the distance between the pivotal connection of the crank standard with the stub tongue and the point of engagement of the pole tongue and crank standard.

11. A tongue truck for harvesting machines or the like having in combination, an axle having supporting wheels, a stub tongue, a standard pivotally connected to said stub tongue and axle and adapted to be swung laterally and bent intermediate its ends to form a crank, and a pole tongue pivoted on the stub tongue and engaging with the crank portion of the standard forwardly of the pivot of the latter on the stub tongue.

12. A tongue truck for harvesting machines or the like, comprising an axle having supporting wheels, a stub tongue, a crank standard pivotally connected with said stub tongue and axle, and a pole tongue pivoted on the stub tongue rearwardly of the pivotal connection of the crank standard thereon and engaging with the crank standard forwardly of the pivotal connection of the crank standard with the stub tongue.

13. A tongue truck for harvesting machines or the like, comprising an axle having supporting wheels, a stub tongue, a crank standard vertically pivoted on said stub tongue and horizontally pivoted on said axle, and a pole tongue pivoted on the stub tongue rearwardly of the pivotal connection of the crank standard thereon and engaging with the crank standard forwardly of the pivotal connection of the crank standard with the stub tongue.

14. A tongue truck for harvesting machines or the like having in combination, an axle having supporting wheels, a stub tongue, a standard pivoted on the stub tongue and bent intermediate its ends to form a crank, a portion of said crank extending substantially parallel with the stub tongue, a downwardly extending portion of said standard pivoted on the axle, and a pole tongue pivoted on the stub tongue and engaging with the downwardly extending portion of the standard.

15. A tongue truck for harvesting machines or the like having in combination, an axle having supporting wheels, a stub tongue, a standard vertically pivoted on the stub tongue and bent intermediate its ends to form a crank, a portion of said crank extending substantially parallel with the stub tongue and bent downwardly and horizontally pivoted on said axle, a pole tongue pivoted on said stub tongue to swing laterally, and a slot in the pole tongue with which the downwardly bent portion of the standard engages.

16. A tongue truck for harvesting machines or the like, having in combination, an axle having supporting wheels, a stub tongue, a pole tongue pivoted on the stub tongue, a crank standard pivoted to the stub tongue forward of the pivot of the pole tongue, a slot in said pole tongue, said crank standard having a portion extending forwardly above the pole tongue, a downwardly extending portion engaging with said slot and projecting downwardly and rearwardly, the downward end of said crank standard pivoted on said axle laterally of the axis thereof.

In testimony whereof I affix my signature, in presence of two witnesses.

JOSEPH DAIN.

Witnesses:
BERTHA A. MAURER,
W. G. DUFFIELD.